(12) United States Patent
Fostick

(10) Patent No.: US 7,133,504 B2
(45) Date of Patent: Nov. 7, 2006

(54) NON-VOICE COMPLETION OF VOICE CALLS

(75) Inventor: Gideon Fostick, Givat Shmuel (IL)

(73) Assignee: Comverse Ltd., Tel Aviv (IL)

( * ) Notice: Subject to any disclaimer, the term of this patent is extended or adjusted under 35 U.S.C. 154(b) by 860 days.

(21) Appl. No.: 09/843,771

(22) Filed: Apr. 30, 2001

(65) Prior Publication Data

US 2002/0159572 A1 Oct. 31, 2002

(51) Int. Cl.
*H04M 11/06* (2006.01)
(52) U.S. Cl. ............................... 379/88.14; 379/88.23; 704/270.1; 709/206
(58) Field of Classification Search ............. 379/88.01, 379/88.02, 88.13, 88.14, 88.17, 88.18, 67.1, 379/88.12, 52
See application file for complete search history.

(56) References Cited

U.S. PATENT DOCUMENTS

| | | | | |
|---|---|---|---|---|
| 5,146,487 A * | 9/1992 | Bergsman et al. | ....... | 379/88.24 |
| 5,787,151 A * | 7/1998 | Nakatsu et al. | .......... | 379/88.23 |
| 5,943,399 A * | 8/1999 | Bannister et al. | ........ | 379/88.17 |
| 6,203,192 B1 * | 3/2001 | Fortman | ................... | 379/88.14 |
| 6,404,860 B1 * | 6/2002 | Casellini | .................. | 379/88.17 |
| 6,483,899 B1 * | 11/2002 | Agraharam et al. | ..... | 379/88.14 |
| 6,507,643 B1 * | 1/2003 | Groner | .................... | 379/88.14 |
| 6,529,737 B1 * | 3/2003 | Skinner et al. | ............. | 455/466 |
| 6,775,360 B1 * | 8/2004 | Davidson et al. | ........ | 379/88.14 |
| 6,956,831 B1 * | 10/2005 | Mahr | ......................... | 370/310 |
| 2002/0085701 A1 * | 7/2002 | Parsons et al. | ........ | 379/211.01 |

\* cited by examiner

*Primary Examiner*—Gerald Gauthier
(74) *Attorney, Agent, or Firm*—Sughrue Mion, PLLC

(57) ABSTRACT

The present invention relates to a system for allowing a caller to leave a voice message for a called party, who is unavailable, such that the voice message is transferred to the called party in a non-voice format. The present invention enables the user to automatically receive these voice messages via SMS or any other platform to any communications device, and to forward the message to any chosen communications device. In addition, the present invention enables a user to reply to an original caller, with a voice message, which can be instantaneously received by the original caller in a non-voice format. The present invention enables both automatic voice-to-text conversion and media switching, whereby the calling party leaves the message in voice format, and the message is converted and transferred to text format on the fly, in order to be instantaneously transferred to a message receiver to his/her chosen device. The present invention also includes the option of choosing a textual message, from an existing pre-configured list, via a voice/IVR interface.

9 Claims, 3 Drawing Sheets

NON-VOICE COMPLETION OF VOICE CALLS

BACKGROUND OF THE INVENTION

1. Field of the Invention

The present invention relates to voicemail systems, and in particular to voicemail systems that provide message retrieval in a non-voice format.

2. Description of the Related Art

Call answering is an extremely popular service. Conventional voice-based call-completion messaging systems enable callers to leave messages for unavailable parties, such that the called parties are required to call their voice mailboxes to retrieve their messages. Conventional voice-based call-completion messaging systems do not provide instant notifications, or alternative means for accessing the actual message content.

Current call-answering and call-completion systems allow the caller to leave the called party a voice message, when the called party is unavailable to receive the call. This system is quite convenient for the caller, but places a degree of inconvenience on the called party. The inconvenience results from the fact that the called party needs to perform the operation of calling the voice mailbox and retrieving the message. The retrieval is inconvenient because:

i. The retrieval is relatively time consuming. In the case of mobile telephone subscribers, this time translates into increased airtime and commensurate expense.

ii. The retrieval is intrusive: the called party cannot retrieve a message quietly during a meeting, but must make a telephone call and concentrate accordingly in order to hear the message.

iii. In the case of calling a wireless telephone subscriber, if the called party does not have his/her cellular/wireless telephone on hand, s/he may not be able to access the voicemail box, or even know that a message has been left for them.

iv. Commonly, the retrieval is not performed until a relatively large time interval has passed, often causing the message to lose relevance, and thus missing the caller's original purpose in leaving the message.

An additional, and increasingly important, dimension of voice messaging is responding to the message. When a called party retrieves a stored voice message, he or she may want to rapidly contact or respond to the calling party. A common way to do this is by return call or by return voice message. Often, however, these methods may not be quick or convenient enough in gaining the calling party's attention, as the calling party may have switched devices and may no longer be available on, or have access to, his or her voice device.

Various prior art examples of solutions for these problems are available, such as: U.S. Pat. No. 6,006,087 describes a method and system for delivering a voice mail notification to a subscriber using a cellular telephone network. This invention, incorporated herein by reference, describes a way to notify a cellular user that a voice message has been left in their mailbox, so that the called party can call the voice mail system in order to retrieve the message. This invention enables the reduction of the time lag between the leaving of a message and the notification to the called party, but does not enable the passing on of the actual contents of the message to the called party.

PCT application number WO002367A1 describes a voice mail server system, which transmits voice messages to a mobile station. According to this invention, which is incorporated herein by reference, a system is provided to adapt, transmit, receive and readapt a voice message, in order to deliver it without a delay to a mobile station. According to this invention, a voice message is not retrieved by the recipient but rather actively pushed to the handset by the network. In this way, the invention merely deals with an efficient format for the voice content to be coded and delivered.

Current Technologies Dealing with this Field Include:

"Cellcomtext:"(world wide web at cellcom.co.il/index.html) is a system for sending text messages to a subscriber, such that a caller may use voice commands to compose and send messages. This system enables immediate notification to the subscribers mobile telephone, via Short Messaging Service (hereinafter "SMS"), and enables subscribers to silently access the actual content of messages. The disadvantage is that the messages are limited to a pre-programmed list of common messages. Furthermore, the sender needs to be aware of the service's existence, and must remember the number of the service, in order to dial in to receive the original (audio) messages. The process of composing a reply message is time consuming and limited in alternatives, as it is dependant on similar interaction with an Interactive Voice Response (hereinafter "IVR") system, and a limited selection of messages.

A similar technology is Globelines Landline Texting system (world wide web at globe.com.ph/), which provides a system that enables sending text messages composed via landline telephones. These telephones require proprietary client software, and enable composition of text messages using DTMF-based dialing (typing key numbers 1–4 times for the letter or symbol required). This system uses an IVR system and aids the user by providing a list of pre-composed messages.

VocalLink (world wide web at vocallink.com/faq.asp) is a system that enables users to listen and reply to all messages, whether email, voicemail or faxes, using any telephone, computer or wireless device from one central location. Voice messages are either transmitted as .WAV files, or converted to text using a speech to text converter. Access to messages is achieved via calling in to a central location. This system requires phoning into central number to access a users messages.

Various other technologies provide messaging services, such as universal messaging, Internet messaging etc., whereby voice and other messages are transmitted to various devices, and can be accessed by those devices, when convenient for the called party. In universal messaging (UM), for example, the calling party sends messages via existing media, in the accustomed manner, and the UM system's contribution is to gather them all into one central inbox. UM does not in any way change the process of the message deposit. A voice message remains a voice message, and a text message remains a text message.

There is thus a widely recognized need for, and it would be highly advantageous to have, a system that can enable a caller to leave a voice message for a presently not-available call receiver (hereinafter referred to as a called person (CDP), wherein the caller may use any voice enabled device to leave a message, and the receiver may use any device to receive themessage according to the preferences of both the caller and receiver. Moreover, it would be advantageous to enable switching of the message medium within the course of the calling party's deposit/message creation process.

Furthermore it would be advantageous to push the message to the receiver instantly, and for the receiver to exercise control over how and when to receive the message.

There is a further need for, and it would be advantageous to have, a system that can enable a message receiver to respond to a message sender immediately, by composing a message using voice, and having the system automatically send it to the original sender in a non-voice format.

SUMMARY OF THE INVENTION

According to the present invention there is provided a system for allowing a calling party, a person initiating a call (hereinafter CGP) to leave a voice message for a called party (hereinafter CDP or subscriber) who is unavailable, and enabling the called party to receive the original voice message in various non-voice formats, including SMS, via various communication devices. The present invention enables both automatic voice-to-text conversion and media switching, whereby the calling party leaves the message in voice format, and the message is converted to text and transferred to a message receiver device chosen by the CDP. The present invention also includes the options of choosing a pre-configured textual message or composing a partially pre-recorded message, via a voice/IVR interface. The present invention also includes a function to enable a CDP to reply to a message using a conventional voice-based device, such that the voice reply is converted and sent to the original message sender in a non-voice format.

The present invention provides a solution for the limitations in the current voice-mail systems, by providing a system that allows the caller to send a message to a called party, in such a way as to gain the immediate attention of the called party. This is achieved by having the system send the called party content of an actual message, from within the voice mailbox, via one or more of several non-voice media, including:

SMS: Internet-based Instant Messaging ("IM") service
E-mail
Fax
Pager
Any other IP based messaging service The advantages of the present invention over the known Prior Art include:

1. Advantages over Conventional Voice-based Call-completion:

The CDP retrieves the message "instantly", i.e. can read the message very quickly as compared to voice call answering. The time involved in the retrieval process in vastly improved. The CDP can get the message silently, for example, during a meeting.

The CDP will commonly read the message shortly after it is sent, thereby ensuring that the message is still relevant. This reflects an improvement in the time interval between deposit and retrieval.

2. Advantages over "Cellcomtext"

The calling party (CGP) does need to be aware of the service at the time of composing the message. Rather, the natural flow of the Call completion process guides her or him and leads her/him in the use of the service.

Cellcomtext is not part of the Call Answering and Completion process. It requires calling into a provider database in order to receive voice messages, and limits conversion to text to a limited selction of pre-programmed messages. The present invention, in contrast, is integrated into the the Call Answering and Completion process, in that voice messages are automatically converted to text, and transferred to subscribers. These subscribers thereby receive the actual content of voice messages without having to dial in to any service numbers, and without having to navigate IVR or text menus. Replying to such messages is also vastly simplified, according to the present invention, as the replyer need only execute a reply command and dictate the message. This voice message will be delivered to the relevant destination device, and where necessary, will be translated into a text form and transferred to the original sender as a SMS, email, fax or IM message, or in some other non-voice format.

3. Advantages over conventional SMS

The system of the present invention provides a way of sending SMS and other textual messages, even if the sender does not posses a mobile telephone, or another device capable of sending SMS messages to the CDP.

The present invention enables composing messages by voice or text, which can be instantly sent to any communication device, which automatically receives the messages in either voice or non-voice format.

The present invention therefore includes the following innovative aspects:

1. Allowing CGP to easily send messages in a plurality of non-voice formats via any (fixed or mobile) telephone, or communication device, and
2. Allowing convenient, instant textual call-completion messages from within the existing framework of voice-based call completion services.

The preferred embodiment mode of the present invention provides for a system for sending a message to a called party from within a voice mailbox, via non-voice media. This system is comprised of:

i. a communications device for enabling message sender to send a message;

ii. a communications device for enabling a called party (CDP) to receive at least one message from the calling party (message sender); and iii. a Call Answering System ("CAS") for processing and handling the sending and receiving of the message.

According to this preferred mode, a method is provided for automatically completing a voice call via non-voice means. An alternative mode of the present invention provides for a method for switching a message medium from voice to text, within the course of a calling party's deposit process.

A further mode of the present invention provides a system for enabling a caller to send short message service (SMS) messages via a conventional telephonic communications device. An additional mode of the present invention is a system that enables a message receiver to respond to a message sender immediately, by having the system send back a voice or non-voice message to a sender of an original message, from within a voice mailbox. This embodiment furthermore consists of a system for enabling a voice message receiver to reply to the voice message by sending at least one short message service (SMS) message via a voice-enabled communications device. This embodiment also incorporates a new method for executing a non-voice response to a voice message.

BRIEF DESCRIPTION OF THE DRAWINGS

The invention is herein described, by way of example only, with reference to the accompanying drawings, wherein.

DESCRIPTION OF THE PREFERRED EMBODIMENT

The present invention relates to a system and method for enabling the completion of voice calls that are directed toward receiving parties who are not currently available. Specifically, the present invention can be used to complete and respond to voice calls by non-voice means, and moreover to change the process of a message deposit, wherein the invention switches the message medium within the course of a calling party leaving a message to a second person or a group of people.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
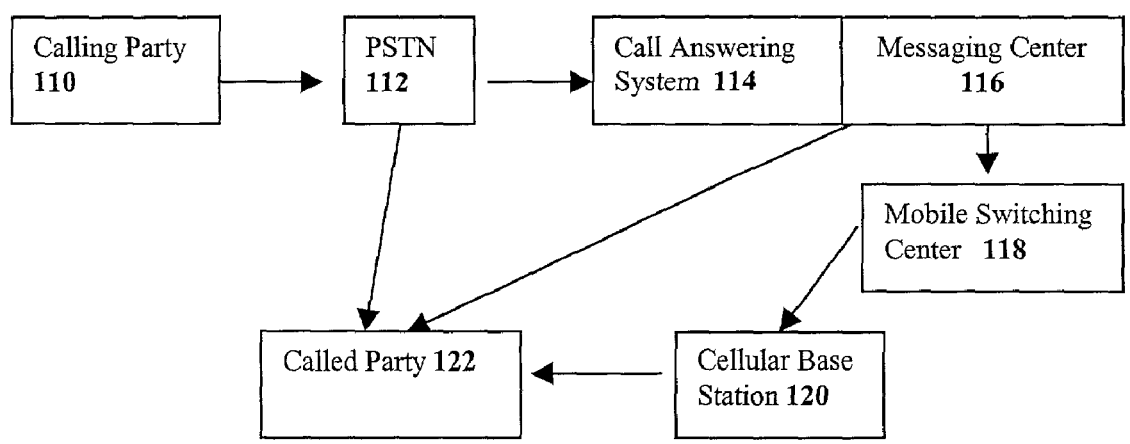
FIG. 1 is a block diagram illustrating the Call Answering System of the invention in the context of telecommunications infrastructure.

The present invention refers to the following terms and phrases, which are defined below:
CAS: Call Answering System
AVRS: Automatic Voice Recognition Server
CDP: CalleD Party or Subscriber, the party being called
CGP: CallinG Party, the party initiating a call
IM: Instant Messaging
IVR: Interactive Voice Response system
SMS: Short Message Service The principles and operation of a system and a method according to the present invention may be better understood with reference to the drawings and the accompanying description, it being understood that these drawings are given for illustrative purposes only and are not meant to be limiting, wherein:

The Block Diagram in FIG. 1 provides an illustration of the communications architecture into which the present invention fits. As can be seen, a calling Party (CGP) 110 initiates a call to a called party (CDP) 122 of a system. The call gets channeled via the Public Switched Telephone Network (PSDN) 112. If the CDP 122 is available, the call gets directed directly to the CDP 122. If the CDP 122 is not available, the call is forwarded to the Call Answering System (CAS) 114 of the present invention. Here the calling party 110 leaves a message, which is processed, as will be described below. The processed message passes to the Messaging Center 116 where it is configured for transfer to at least one of a plurality of end-user devices. If the message must be sent to a wire-based destination, it will be sent via a wire-based infrastructure to the CDP 122. If the call is sent to a wireless device, the message is channeled to a mobile switching center 118, and then on to a cellular base station 120. From here the message is transferred to a CDP or wireless subscriber 122.

Figure 2:
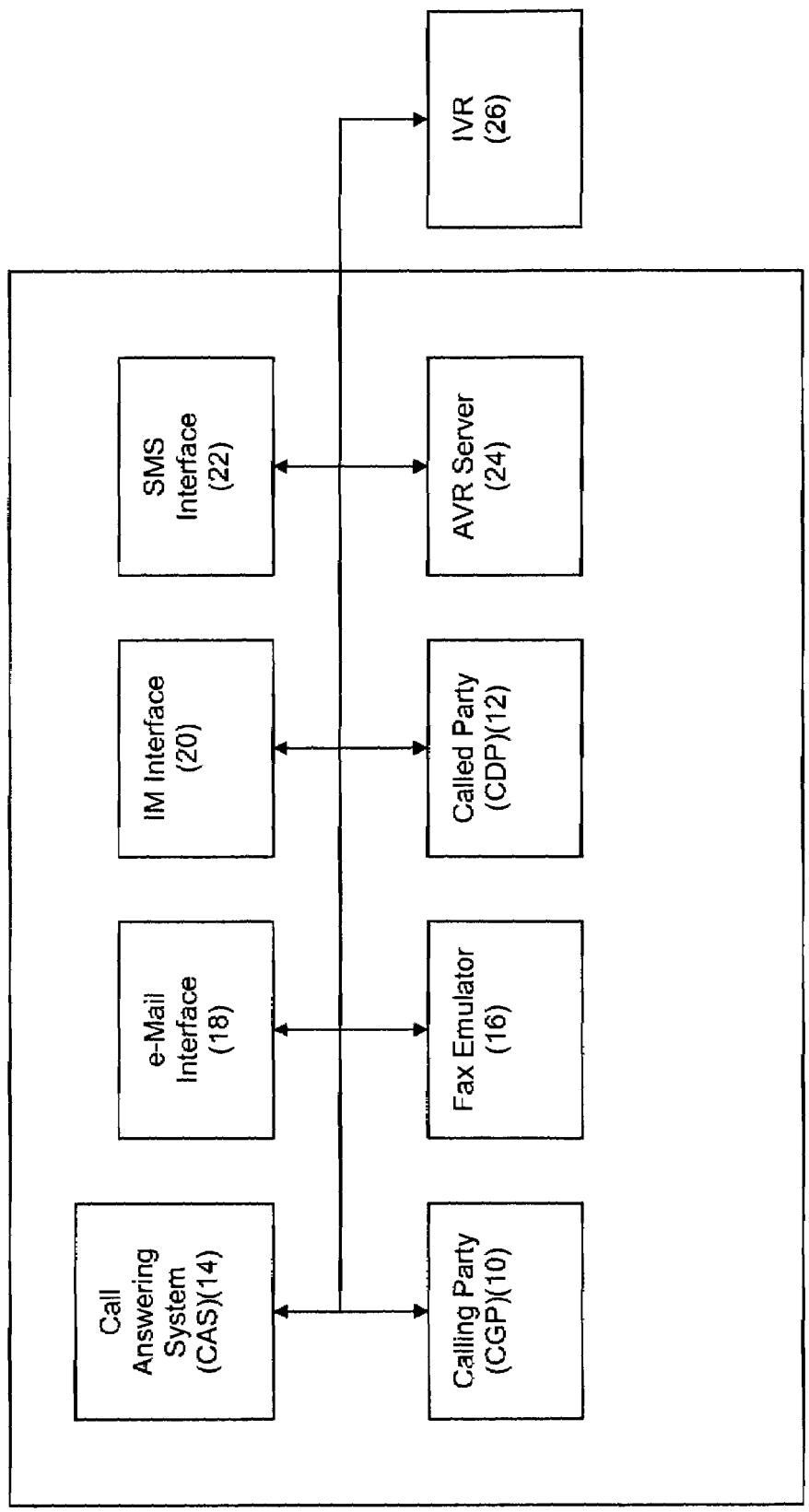
FIG. 2 is a block disgram of the present invention.

The Block Diagram in FIG. 2 provides a description of the building blocks of the present invention. A user, the CallinG Party ("CGP") 10, wishes to call a CalleD Party ("CDP") 12. A voice call to an available CDP 12 is directed via the PSDN 112 to the CDP 12. In the case where the CDP 12 is unavailable, the call is forwarded to a Call Answering System ("CAS") 114/14, configured to handle and implement the call answering and call completion processes.

In the case where a CGP 10 chooses to leave a voice message, the call answering system (CAS) 14 sends the voice content to an "Automatic Voice Recognition Server" (AVRS) 24. This component, either internal or external to the CAS 14, translates the voice into a non-voice format, such as text, by employing the necessary voice recognition software.

An example of such software is Comverse Network System's "Tel@Go voice-recognition assistant"(world wide web at comverse.com/solutions/spee_por.htm). The voice recognition software component required for the working of the present invention may be of various standards. Currently, most voice recognition software packages are either able to be trained by the user to recognize his/her basic language, or at least are able to recognize and convert basic conversational words. In addition, it is expected that a relatively limited vocabulary will comprise a large portion of the terms used in common messages (e.g. "Call", "Meeting", "Later", "Ten-thirty"). This limited vocabulary can greaatly enhance automatic speech response (ASR) performance to the degree that a very high percentage of messages will be correctly recognized. This level of voice recognition suffices for the requirements of the present invention, since the gist of a message, or at least basic instructions may be understood and processed.

It is anticipated that future voice recognition software systems will provide better recognition, which will enable greater usability of the present invention. The text format of the original voice message may then be returned to the CAS 14. In this way, a voice message left by a calling party 10 can be converted on the fly (in real-time or almost real-time) to a textual message, in order to arrive at the called party 12 via the chosen voice or non-voice means. The CAS 14 makes use of various possible application software programs, referred to as application tools, including a Fax Emulator 16, e-Mail Interface 18, Instant Messaging (IM) Interface 20, and SMS Interface 22, as needed, or a combination thereof. These mediums are used to process and send messages in the respective formats, so that these messages will be readable to a plurality of communication devices. These devices include PC's, facsimiles, handheld computers, notebook and mini notebook computers, wireless telephones and any other communication gadgets and devices. In the case where the converted voice message is too long to be sent as a conventional SMS message, the converted message may be broken up into more than one SMS message, the combination thereof presenting to the CDP the complete converted message.

The Process

Figure 3:
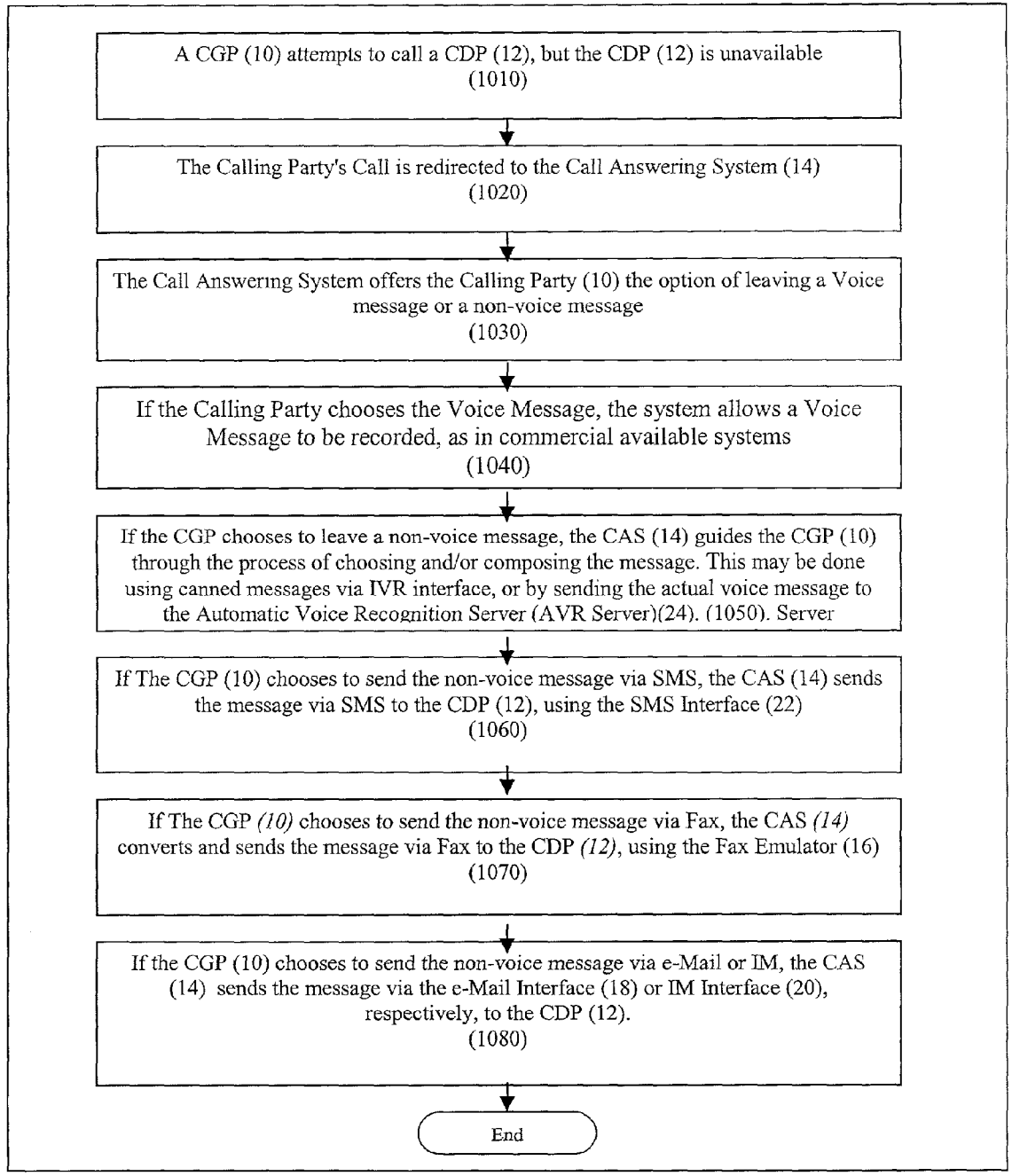
FIG. 3 is a flowchart illustrating the process according to the present invention.

The Flowchart in FIG. 3 describes the process of the invention. The CGP 10 wishes to call the CDP 12. In the case where the CDP 12 is unavailable 1010, the CGP 10 is transferred 1020 to the CAS 14. The CAS 14 communicates with the CGP 10 via Interactive Voice Response (IVR) 26 (shown in FIG. 2), and offers the option of sending the CDP 12 a conventional call-completion voice message or a non-voice (such as textual) message 1030.

If the CGP 10 chooses to leave a conventional voice message, the process is handled in an identical manner to prior art Voice Call Answering services 1040, wherein the voice message is forwarded to the mailbox of the CDP 12.

If the CGP chooses to leave a textual message, the CAS 14 guides her/him through the process of choosing and/or composing the message 1050. The message may optionally be a pre-recorded message or one of several "canned" messages, i.e. pre-prepared messages in an existing list, such as "Call Me" or "I Love You". The called party (CDP) 12, or subscriber, may pre-program any number of canned messages, and may specify which messages may be used for which calling party etc. The message may also contain a part that must be chosen by the CGP 10, such as a textual section of the message that is not "canned" or pre-selected, but needs to be selected during the message composition. This section may alternatively be entered via a conventional telephone keypad. For example, the CGP 10 may be required to leave a specific message type in the form of, "The meeting is at HH:MM", where the CGP 10 chooses the time of the meeting, and the system enters it into the message, via voice, keypad etc. Another example of such message parts are telephone numbers, such that these may be used to specify personal information. For example, a telephone number that the CGP 10 is requested to call may be entered: "Please call number NN-NNNNNNN".

The chosen or composed voice message is sent to the Automatic Voice Recognition Server (AVRS) 24, where the voice data is converted into a text format, using the necessary voice recognition software. The AVRS 24 returns the converted message to the CAS 14. The CAS 14 then optionally makes use of a Fax Emulator 16, e-Mail Interface 18, Instant Messaging (IM) Interface 20, and/or SMS Interface 22, as necessary, to further format and prepare the message in order to send the message in the appropriate format and via the medium chosen by the CGP 1060, 1070, 1080. Each of these application tools are taken from existing software systems, for example, application tools from Comverse Network Systems, Inc. (world wide web at comverse.com, Wakefield, Mass., USA). The SMS interface 22 enables automatic translation of a voice message into text, such that the text can be used as a SMS message. The email interface 18, the IM interface 20, and Fax emulator 16 perform functions similar to the SMS interface 22, according to the nature of the destination of the message. It is thereby possible to compose a message by speech on various devices or platforms, and subsequently translate the speech to text, for all forms of non-voice messaging. This invention thereby enables the changing of the process of the message deposit, wherein the invention switches the message medium within the course of the calling parties deposit process.

Alternate Embodiments

An additional embodiment of the present invention is a system for enabling a called party (CDP) 12 to reply by voice to a message received from a calling party (CGP) 10, such that the reply message may be sent to the CGP in various non-voice formats via any preferred communications device. This embodiment allows the (original) CDP 12 (now the call responder) to respond immediately to the (original) CGP 10, by having the system send back a voice response in a non-voice format to the CGP 10. This takes place from within the voice mailbox, without waiting for the original sender to access the message manually. The sending of the message is executed via one or more non-voice media, including SMS, Instant Messaging ("IM"), E-mail and Fax.

According to this Embodiment:

A calling party (CGP) 10 attempts to call a called party (CDP) 12. If the CDP 12 is unavailable, the CGP 10 is routed to the call answering service (CAS) 14, whereby the CGP 10 leaves a voice or non-voice message for the CDP 12. Alternatively if the CDP 12 is not a user or subscriber to the system, a voice is left in the CDPs 12 conventional voice mailbox.

The message receiver or CDP 12, if not a user or subscriber to the system, may access the conventional voice mailbox (existing in prior art voice answering systems) to retrieve the voice message. Alternatively, according to the preferred embodiment of the present invention, the CDP 12 automatically receives the message in text form. The system subsequently prompts the CDP 12 to respond to the CGP 10. This response may be either by a return call, regular voice message, by notifying the CGP 10 that the CDP 12 is now available to accept messages via his or her chosen device, or by leaving a non-voice message.

Accordingly, the CDP 12 may call the CGP 10 using a voice enabled telephonic device, or any other communications device. If the CGP 10 is available, a voice call can proceed. If the CGP 10 is not available (ie. is not connected to a network, does not answer the call, initiates voice mail etc.), the CDP 12 may compose a voice message to be sent to the CGP 10 via non-voice means, to the device at which the CGP 10 is currently available or otherwise chosen by the CGP 10. The call system may assume availability on the same device from which the original message was sent, or alternatively may request of the CGP 10 when leaving the initial message to specify his or her preferred rules for receiving messages, such as his or her preferred receipt address or device, his or her preferred format, and his or her preferred times etc. The CDP "knows" which device is currently being used by the CGP, since the telephone number of the calling device is presented. This number commonly identifies whether the device is wireline or mobile.

Alternatively, an availability service like Comverse Network System's "Nex2ME" (http://www.comverse.com/solutions/comm_ent.htm) stores information on each subscribers' present device or preferred means of receiving messages. Such a system facilitates instant communications between mobile and Internet users by allowing users to set their own availability status and connect with other users based on predefined criteria. Alternatively the CGP can choose based on their familiarity with the other party. This may be sent via a plurality of means, including SMS, IM, e-mail, or fax. If the CDP 12 chooses to compose a non-voice message using a voice-enabled device, the system prompts the CDP 12 to compose a message by one of three means:

i. Choosing one of an existing list of pre-configured messages. This list will include default messages such messages as "Call me", "Next meeting cancelled", "I love you", etc.

ii. Composing the message by speech, whereby the system sends the voice message to an Automatic Voice Recognition Server 24, where it is converted to a textual message, and returned in text-format to the CAS 14.

iii. Composing the message by voice or any other input means, by selecting and adding to a pre-recorded message, such that part of a prepared message is taken from a prerecorded message, and at least one additional part of the composed message is chosen by the CGP 12. For example, the CDP 12 may be required to leave a specific message type in the form of, "The meeting is at HH:MM", where the CDP 12 chooses the time of the meeting, and the system enters it into the message. This additional part may be added via voice input, keypad or any other type of input.

Finally, the CDP 12 chooses or composes a message, as described above, and the CAS 14 sends the message, optionally via more than one of the available services, to the CGP 10. In this way the CDP 12 may use voice means to contact a CGP 10 in an immediate way, in a non-voice format on any text enabled communications device.

Several other embodiments are contemplated by the inventors. The present invention as described above may also be implemented with or without notification of the CDPs 12 availability via various media, and with or without text-to-speech capability.

Advantages of the Present Invention

Advantages of the present invention include: allowing a CGP 10 or a CDP 12 to easily send, receive and manage SMS messages via any (fixed or mobile) telephone or communication device that is voice enabled, from within the existing framework of voice-based call completion services.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A system for enabling a calling party to use voice narration to send a text message to a wireless communications device, comprising:
   i. a voice-enabled communications device for composing a voice message;
   ii. a call answering system (CAS);
   iii. an Automatic Voice Recognition Server for converting said voice message to converted text, and transferring said converted text to said CAS; and
   iv. an Interactive Voice Response System for selecting a pre-prepared message from a plurality of available pre-prepared messages;
   wherein said CAS provides the text message, including the pre-prepared message and said converted text,
   wherein the plurality of available pre-prepared messages are pre-programmed by a called party.

2. A system for enabling a message receiver to reply to a message by sending at least one short message service (SMS) message, such that the SMS message is composed using voice via a voice-enabled communications device, comprising:
   i. a communications device with voice transmission capability, for composing a voice message;
   ii. a call answering system (CAS) for processing and handling said voice message;
   iii. an Automatic Voice Recognition Server for converting said voice message to a converted text message portion, and transferring said converted text message portion to said CAS,
   iv an Interactive Voice Response System for selecting a pre-prepared message from a plurality of available pre-prepared messages, wherein said CAS provides a text message that includes the pre-prepared message and the converted text message portion; and
   v. a SMS application tool for converting said text message to the SMS message,
   wherein the plurality of available pre-prepared messages are pre-programmed by a called party.

3. The system of claim 2, wherein said pre-prepared message is chosen by a calling party.

4. A method for automatically completing a voice call via non-voice medium, comprising:
   preparing a converted textual portion from a voice message; and
   transmitting a text message to a communications device by a Call Answering System (CAS);
   wherein said text message includes a pre-prepared message selected from a plurality of available pre-prepared messages, and the converted text portion that has been converted from the voice message,
   wherein the plurality of available pre-prepared messages are pre-programmed by a called party.

5. The method of claim 4, wherein said pre-prepared message is chosen by a calling party.

6. A method for switching a message medium from voice to text, within the course of a calling party's deposit process, comprising:
   a. converting a voice message to a converted text format portion using an Automatic Voice Recognition Server, such that said voice message is converted to said converted text format;
   b. preparing a text message, wherein said text message includes a pre-prepared message, selected from a plurality of available pre-prepared messages, and the converted text format portion; and
   c. transmitting said text message to a destination communications device, wherein the plurality of available pre-prepared messages are pre-programmed by a called party.

7. A method for receiving voice-messages in non-voice format, comprising:
   i. receiving a voice message, by a Call Answering System (CAS);
   ii. converting said voice message into a converted non-voice format portion, by an Automatic Voice Recognition Server (AVRS);
   iii. preparing a non-voice format message, including a pre-prepared message selected from a plurality of available pre-prepared messages, and the converted non-voice format portion; and
   iv. transferring said non-voice format message, by said CAS, to a user,
   wherein the plurality of available pre-prepared messages are pre-programmed by a called party.

8. The method of claim 7, wherein said non-voice format message is delivered as a SMS message to said user.

9. A system for receiving a voice message from a calling party, such that the message is received in a non-voice format, comprising:
   i. a Call Answering System (CAS) for processing and handling the voice message; and
   ii. an Automatic Voice Recognition Server (AVRS) for converting the voice message sent to said CAS to a non-voice format, and transferring said converted message to said CAS;
   wherein said CAS provides a non-voice format message, wherein said non-voice format message includes a pre-prepared message selected from a plurality of available pre-prepared messages, and the converted message,
   wherein the plurality of available pre-prepared messages are pre-programmed by a called party.

* * * * *